I. S. DE WITT.
HARROW ATTACHMENT FOR SULKY PLOWS.
APPLICATION FILED AUG. 24, 1909.
962,701.
Patented June 28, 1910.
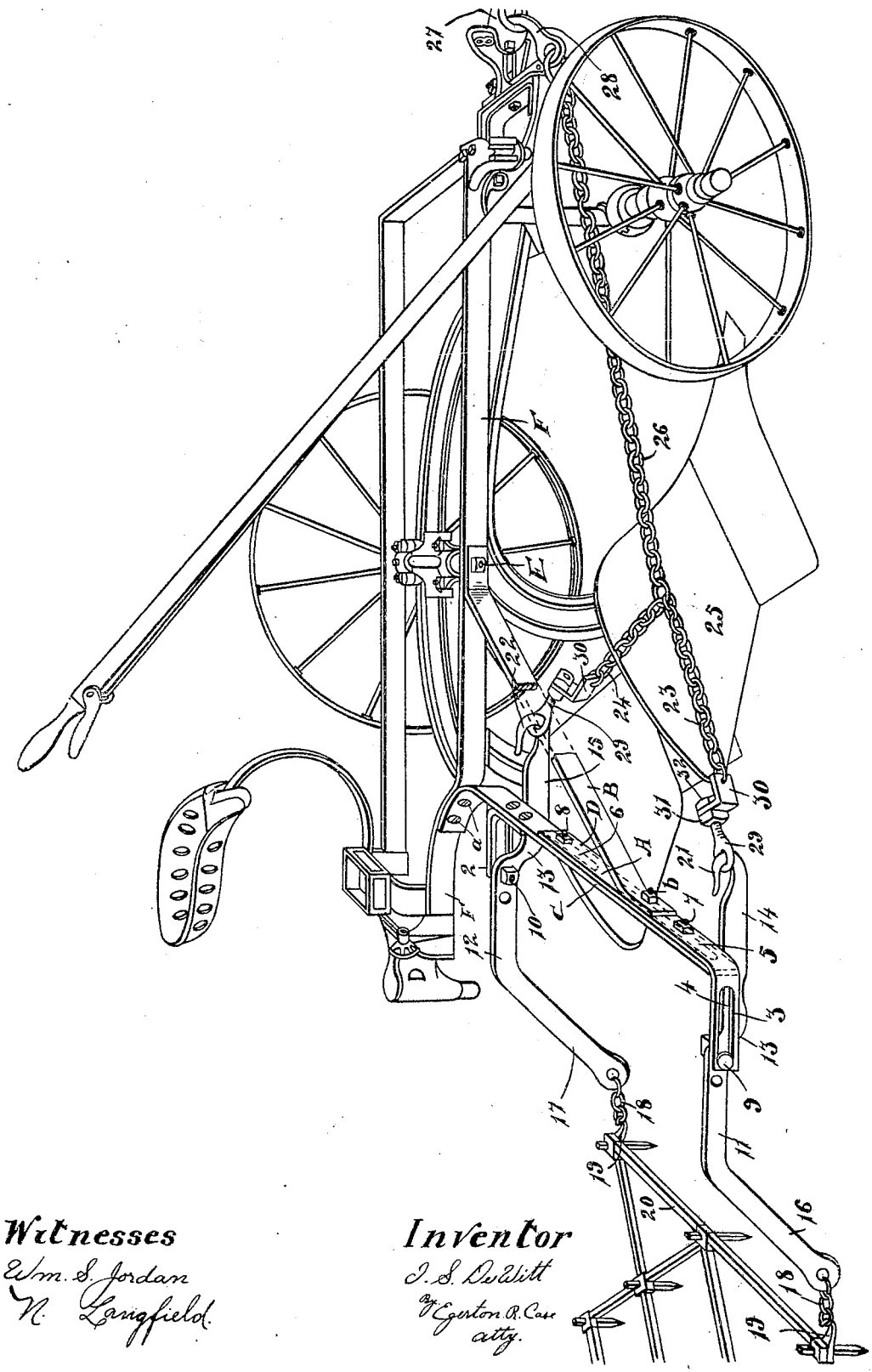
Witnesses
Wm. S. Jordan
N. Langfield
Inventor
I. S. DeWitt
by Egerton R. Case
atty.

UNITED STATES PATENT OFFICE.

IRA SMITH DE WITT, OF NEWDALE, MANITOBA, CANADA.

HARROW ATTACHMENT FOR SULKY-PLOWS.

962,701.  Specification of Letters Patent.  Patented June 28, 1910.

Application filed August 24, 1909. Serial No. 514,448.

*To all whom it may concern:*

Be it known that I, IRA SMITH DE WITT, a subject of the King of Great Britain, residing at Newdale, in the Province of Manitoba, Canada, have invented certain new and useful Improvements in Harrow Attachments for Sulky-Plows, of which the following is a specification.

My invention relates to improvements in harrow attachments for sulky plows, and the principal object of my invention is to design a device of the class described whereby the draft of the harrow is carried by the draw-head and so prevent the bending of the frame of the plow which inevitably results when the draft of the harrow is carried directly by the plow-frame.

Another object of my invention is to design my device so that it may be adjusted to be used with harrows of different widths.

A still further object of my invention is to design a device of the class described which is very cheaply constructed and one which will be very strong and not get out of order, and the preferred construction of my invention will be hereinafter more particularly set forth, and the parts I claim as new will be pointed out in the claims forming part of this specification.

The figure shows a perspective view of a gang-plow with my attachment connected thereto, which is also shown in perspective.

It is a desideratum in connection with attachments whereby harrows are connected to gang or sulky plows, at all times, to throw the draft of the harrow or other implements that may be attached to the plow, directly onto the draw-head for the double trees, so as to prevent the action of any injurious strains brought into play through the use of harrow attachments, against the frame of the plow thereby preventing the frame of the plow being injured. It is also very desirous to arrange the draft means for the harrow or other implement attached to the device, as low as possible, and also to arrange it so that the pull exerted against the harrow or other implement will be in as straight a line as possible, thus preventing as much as possible the bringing into play against the device of injurious side strains.

My preferred form of invention consists of a frame A, composed of a front reach B and two parallel bars C and D. The front reach B is detachably secured by any suitable means as by the bolt and nut E to the member F of the plow-frame, and the bar C is detachably secured by any suitable means, as for instance, nuts and bolts $a$, to the rear portion of the member F of the plow-frame. It will of course be understood that the attached end of the bar C will be bent at the desired angle in order to adapt it for attachment to any make of plow. By means of the nut and bolt $b$, the front reach B is secured to the bars C and D.

2 is a slotted bracket attached to the bar C. The outer end 3 of the bar D is bent and slotted as shown at 4, and is adapted to perform the same function as that performed by the bracket 2.

5 and 6 are longitudinal slots (see dotted lines) formed in the bar C. By means of the nuts and bolts 7 and 8 passing through the bar D and the slots formed in the bar C, the distance between the bent portion 3 of the bar D and the bracket 2 can be regulated in order to adapt my attachment for use in connection with harrows of different widths.

Movably mounted by the nuts and bolts 9 and 10 in the slots formed in the end 3 of the bar D and in the bracket 2, are the draw members 11 and 12, preferably shaped as shown. The said draw members are formed as shown at 13 so that the front members 14 and 15 thereof will be positioned below the bars C and D. The construction just described places the front members 14 and 15 down toward the harrow, thus keeping as low as possible the line of draft of the harrow. The inner portions 16 and 17 of the draw-members 11 and 12 are preferably bent downward as shown. Carried by the eyes of the said rear members are any suitable connecting means such as short chains 18, which connect with the hooks 19 carried by the harrow 20. The said rear members are preferably formed as shown so as to keep the line of draft for the harrow or other inplement attached to the device as low as possible. Attached to the hook-shaped ends 21 and 22 of the front members 14 and 15 are the draft chains 23 and 24, which are connected at 25 to the common draft chain 26 which is connected to the draw-head 27 by a hook 28 or equivalent device.

29 are threaded eye-bars linked to the hooked-ends 21 and 22. Mounted on each threaded eye-bar is a block 30.

31 and 32 are nut-locks mounted on the threaded eye-bars 39 by means of which the block 30 is held in adjusted position. The chains 23 and 24 are connected with their associated block 30.

By means of the construction before set forth it will be clearly understood that the frame A is merely used to support the draw-members 11 and 12 in their adjusted position, and that at no time does the draw of the harrow or other implement, coupled to my device, come on the frame of the plow. As the chains 23 and 24 are coupled directly to the draw members 11 and 12, and to the chain or draft means 26, and this chain or draft means is directly coupled to the draw-head 27, it is clear that the whole pull of the harrow or implement carried by the device is taken up by the said draw-head, and that there is no side strain on the frame of the plow.

By means of the nut-locks 31 and 32, it will be understood that the position of the blocks 30 on the eye-bars 29 can be adjusted so as to at all times insure a straight pull being exerted through the draw-bars 11 and 12 against the implement coupled to the device. When the frame A is adjusted for a narrow harrow after having been attached to a wider harrow, it will be understood that the necessary adjustment of either or both of the blocks 30 must take place in order to insure a straight pull against the harrow and so positively prevent any side strains.

It will be noticed that the frame A is high enough above the plows carried by the plow-frame so as to prevent it from interfering with the furrow turned over by either of the plows, and so prevent the clogging up of the plow.

While I have described what I consider to be the best embodiment of my invention, I desire it to be understood that the principles can be embodied in different forms, and I desire not to be limited beyond the requirements of the prior art, and the terms of my claims.

What I claim as my invention is:

1. A device of the class described comprising a frame composed of two bars; means by which said bars are adjustably held together; two slotted brackets carried by said frame, a draw-member mounted in each slotted bracket, and draft means detachably carried by the front ends of said draw-members.

2. A device of the class described comprising a frame composed of two bars; means by which said bars are adjustably held together; two slotted brackets carried by said frame; a draw-member mounted in each slotted bracket, and each having its rear-member formed downwardly, and the front member of each draw-member being formed so as to be positioned below said frame, and draft-means detachably carried by the front members of the said draw-members.

3. A device of the class described comprising a frame composed of a first bar provided with an attaching end; a second bar provided with a bent outward end having a slot formed therein; means whereby said bars are adjustably held together; a slotted bracket carried by said first-mentioned bar; two draw-members one mounted in the said slotted bracket and the other mounted in the slotted end of the second-mentioned bar, and each having their rear members formed downward, and further having their front members formed so as to extend beneath the said bars, and draft means detachably carried by the front members of said draw-members.

4. The combination with the frame of a sulky plow, and a draw-head therefor, of a stiff supporting element secured to said frame and projecting essentially beyond one side thereof; two horizontally-disposed draw-members movably mounted in said supporting element, and supported thereby in such a manner as to be capable of independent and unitary movement in a horizontal plane, in a direction substantially parallel to the line of draft, and draft means detachably coupling said draw-members to said draw-head.

In testimony whereof I have affixed my signature in presence of two witnesses.

IRA SMITH DE WITT.

Witnesses:
H. L. McGILL,
GEO. CLARKE.